United States Patent

[11] 3,566,988

[72] Inventor John D. Wise
 99 E. 33rd, Paterson, N.J. 07514
[21] Appl. No. 803,562
[22] Filed Mar. 3, 1969
[45] Patented Mar. 2, 1971

[54] DRIVERLESS LAWN MOWER
 8 Claims, 5 Drawing Figs.

[52] U.S. Cl. .................................. 180/79,
 15/312, 46/244
[51] Int. Cl. .................................. B62d 5/00
[50] Field of Search ........................ 180/79,
 79.1, 79.3; 46/212, 244; 15/1.7, 319

[56] References Cited
 UNITED STATES PATENTS
 1,570,547 1/1926 Avera .................. 180/79.1

2,674,331 4/1954 Ovshinsky ............... 180/79.1
3,415,335 12/1968 Wise ........................ 180/79

*Primary Examiner*—Benjamin Hersh
*Assistant Examiner*—John A. Pekar
*Attorney*—James J. Cannon ABSTRACT: A driverless, self-powered lawn mower or the like land processing device, including adjustable, self-contained mechanism for reversing and offsetting each successive path line of travel along a path adjacent the last previous path for systematically mowing or otherwise processing a predetermined rectangular-shaped land area, and further including means, after having completed the last path run of the area being processed, for shutting itself off.

INVENTOR.
JOHN D. WISE
BY James J Cannon
ATTORNEY.

INVENTOR.
JOHN D. WISE
BY James J. Cannon
ATTORNEY.

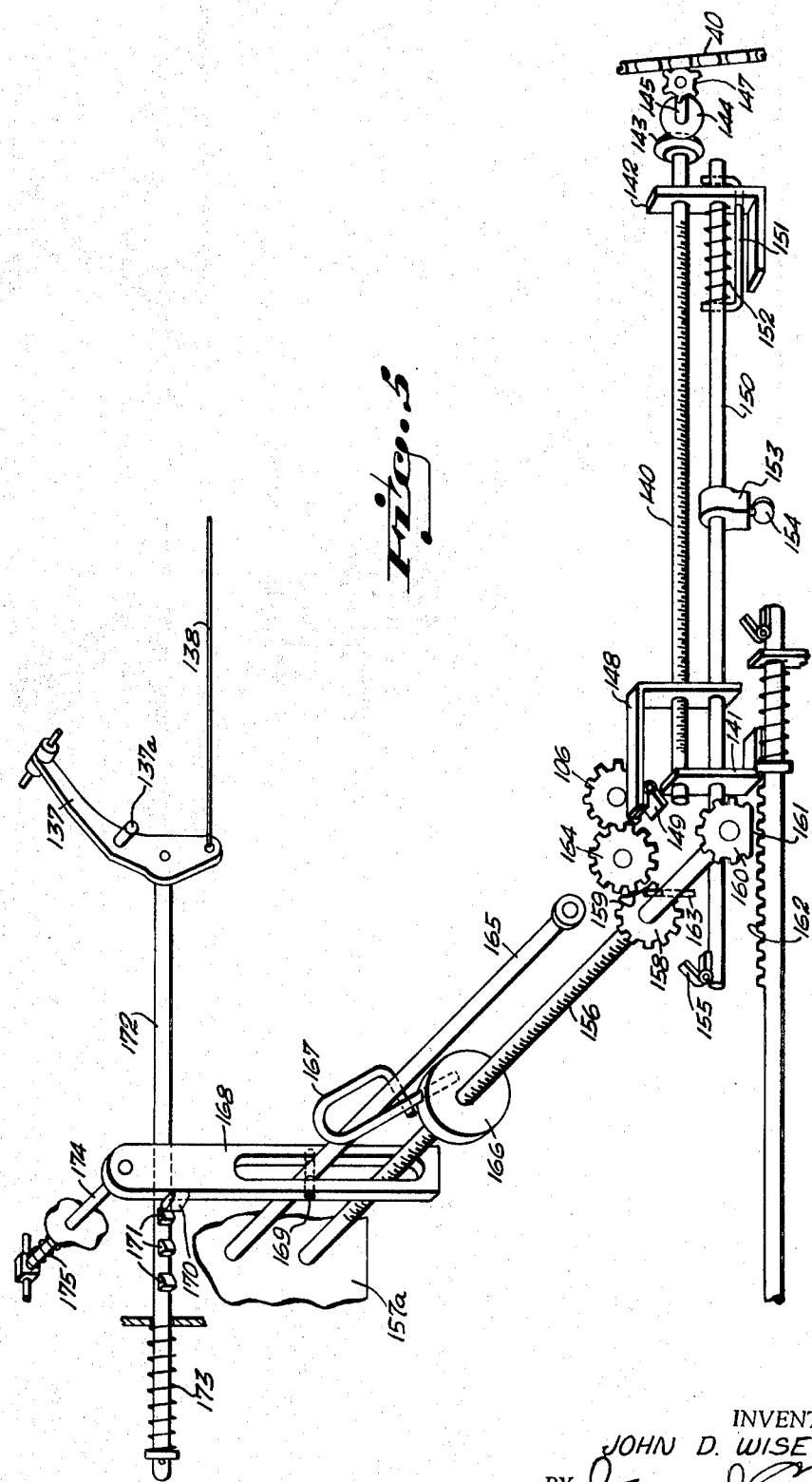

DRIVERLESS LAWN MOWER

In my U.S. Pat. No. 3,415,335 issued Dec. 10, 1968, I described a driverless self-powered lawn mower, including abutment rods and mechanism controlled by the abutment rods upon striking an abutment at the end of a straight line path of travel for reversing the line of travel along a path adjacent the last previous path for systematically mowing a preselected land area. The present invention relates to improvements in the driverless lawn mower described in said patent, and is directed particularly to the inclusion therein of self-contained mechanism for reversing the line of travel after completion of each straight line path of travel run, the path lengths of which can be selectively preset over a wide range. Operation of the mower is thus entirely independent of external actuating means.

The principal object of this invention is to provide an automatic lawn mower which, once having been started and furnished with fuel, can be preset to systematically mow a predetermined rectangular land area and, after completion of the mowing, automatically stop the device.

A more particular object of the invention is to provide an automatic lawn mower of the character described which, whenever it reaches the end of the length of run for which it has been preset, will automatically control clutch and steering mechanism to reverse and travel alongside of the previous run to cut the next successive strip and thereafter continue such back and forth travel until the entire rectangular lawn area to be cut is finished, mechanism being provided for automatically stopping the device after a predetermined number of runs corresponding to the width of the rectangular area to be mowed have been completed.

Another object of the invention is to provide a driverless apparatus of the character described which will be simple in operation, easy to use, and dependable, effective and durable in performance.

Other objects features and advantages of the invention will be apparent from the following description when read with reference to the accompanying drawings.

In the drawings, wherein like reference numerals denote the corresponding parts throughout the several views:

FIG. 5 is an oblique view of the automatic reversal control mechanism, shown separately and on an enlarged scale.

Figure 1:
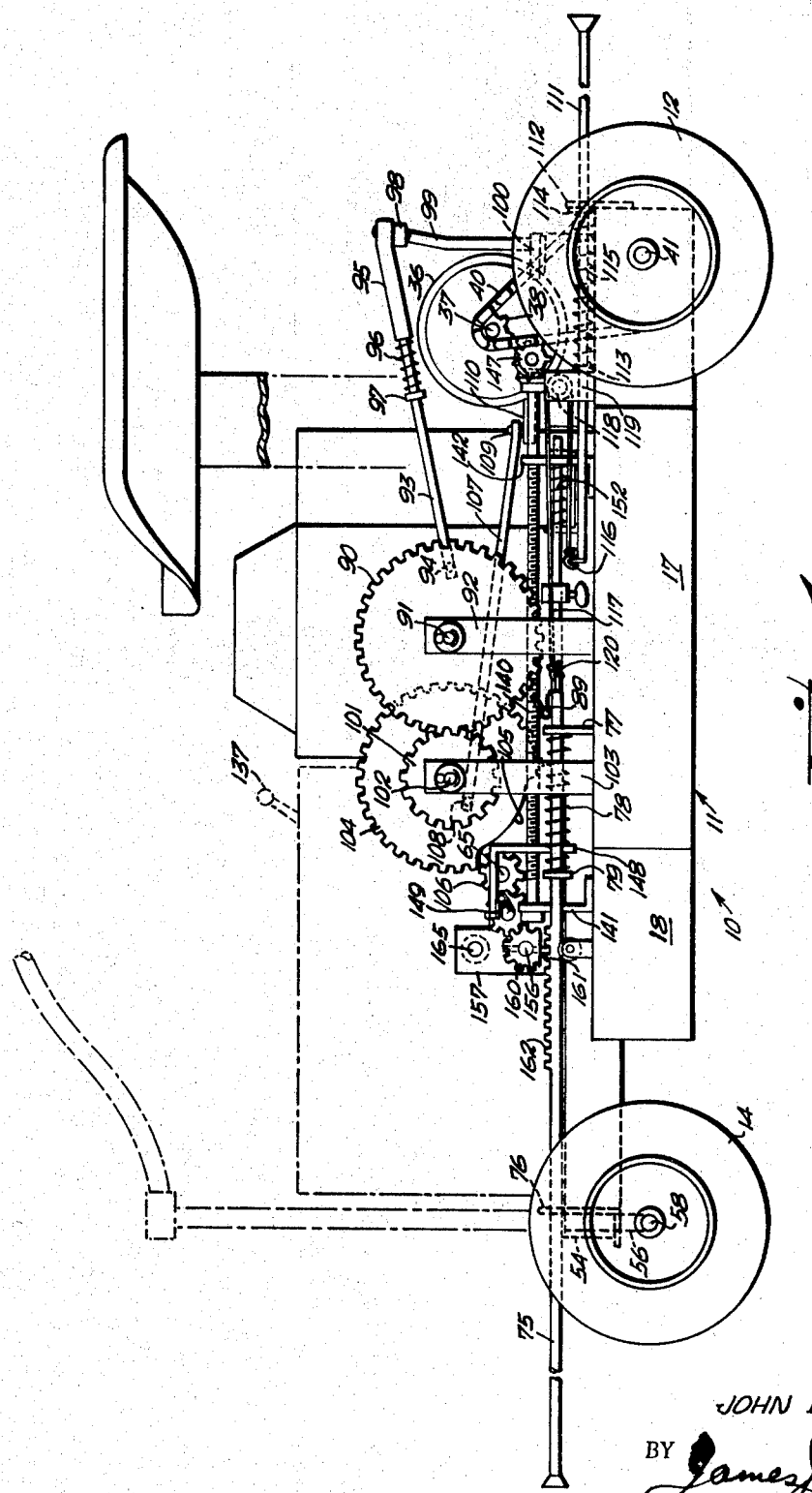
FIG. 1 is a side elevational view of a driverless lawn mower embodying the invention.
Figure 2:
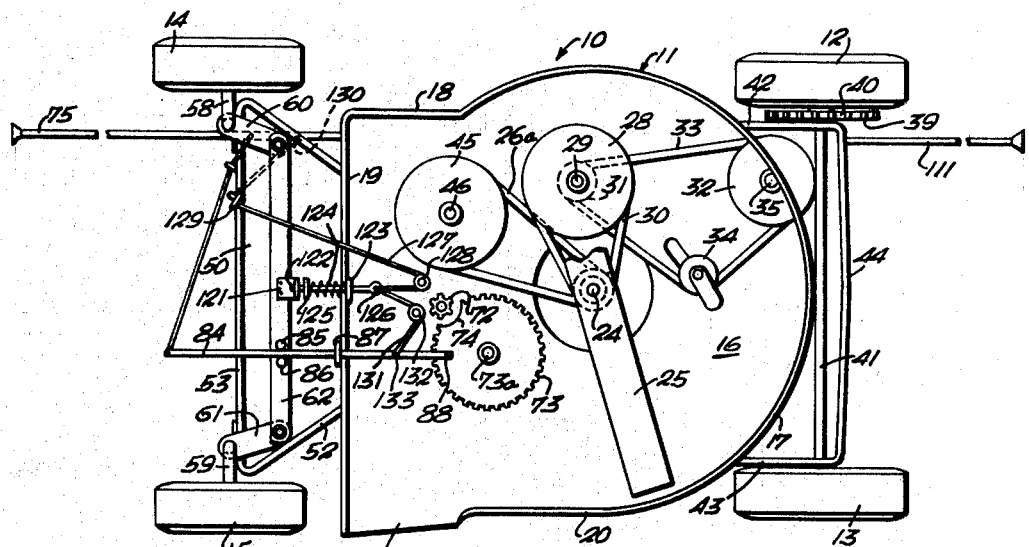
FIG. 2 is a bottom view thereof.
Figure 3:
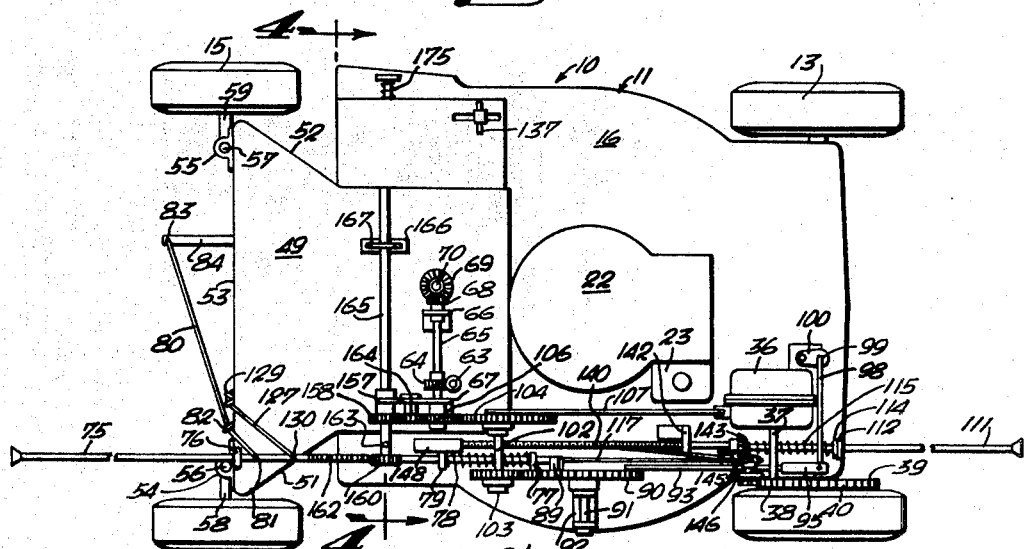
FIG. 3 is a top view thereof.

Referring now in detail to the drawings, 10 in FIGS. 1, 2, and 3, designates, generally, a driverless lawn mower embodying the invention, the same being comprised of a housing 11 supporting the rear wheels 12 and 13 and front wheels 14 and 15. The housing 11, which may be fabricated of cast metal or stamped of sheet metal, is formed with a top wall portion 16 circularly rounded at the rear end thereof and formed with an integral, downwardly-extending peripheral skirt portion 17 which, as illustrated in FIGS. 1 and 2 merges at one side into a forwardly-extending skirt wall portion 18. The front end of the skirt portion 18 turns into a transversely-extending front skirt portion 19, which terminates at the other side of the housing 11. The other side of the peripheral skirt portion 17 of the housing 11 merges into a forwardly-extending skirt wall portion 20 terminating at a position short of the outer end of the transverse skirt portion 19 to define together therewith and with the top wall 16 of the housing 11, a rectangular opening or chute 21 for the discharge of grass or the like being mowed when the device is in operation.

The apparatus is powered by a motor 22, preferably a gas engine, which is centrally affixed atop the top wall 16 of the housing 11 in any conventional fashion. As illustrated in FIG. 3, the motor 22 is provided with a gas tank 23; and as illustrated in FIG. 2, the drive shaft 24 of said motor has affixed to the outer end thereof a standard rotary cutter blade 25. Also secured to the drive shaft 24 is a first or upper drive pulley 26 and a second or lower drive pulley 27, (see FIGS. 2 and 4). The second drive pulley 27 drives a large pulley 28, journaled on a short shaft 29 fixed to and extending downwardly of the underside of the housing top wall 16, by means of a belt 30. As best illustrated in FIG. 2, the short shaft 29 also carries a small pulley 31 which continuously drives a transmission drive pulley 32, through a belt 33, said belt also being trained over an idler pulley 34 adjustably fixed with respect to the underside of the top wall portion 16 of the housing 11. The transmission drive pulley is carried by the drive shaft 35 of a transmission mechanism 36 which, as best illustrated in FIGS. 1 and 3, is fixed upon the housing 11 at the rear corner position thereof. Because of the rear corner position of the transmission mechanism 36 and its associated drive pulley 32, an appropriate slot, not illustrated, is cut in the peripheral skirt portion of the housing, to accommodate said pulley and its drive belt.

As best illustrated in FIGS. 1 and 3, the output shaft 37 of the transmission mechanism 36 carries a sprocket gear 38 which drives a rear wheel drive sprocket 39 (see FIGS. 2 and 3), through a drive chain 40. The wheel drive sprocket 39 is secured near one end of a rear axle 41, journaled in side portions 42, 43 of a U-shaped housing extension member 44 affixed against the rear end of the housing 11 in any convenient fashion such as by welding. From the foregoing, it will be apparent that whenever the motor 22 is running, the associated cutter blade 25 will be rotating, and the input or drive shaft of the transmission mechanism 36 will be turning. As hereinafter described, the transmission mechanism 36 is provided with clutch and reversal mechanisms by means of which the drive to the rear wheels 12 and 13 is controlled.

Figure 4:
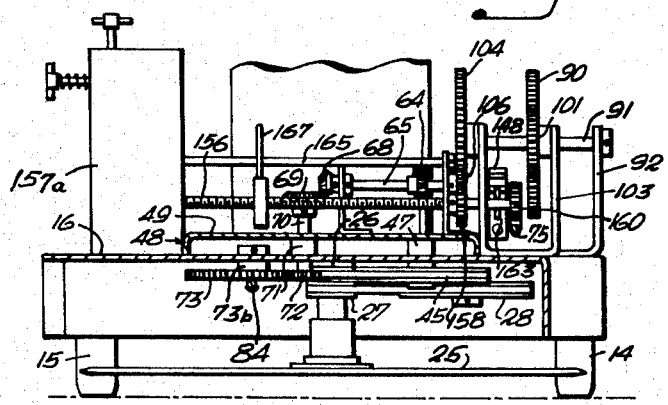
FIG. 4 is a transverse vertical cross section taken along the line 4–4 of FIG. 3 in the direction of the arrows.

The mechanism for controlling the turning or reversal of c8 of the wheels will now be described. To this end, the first drive pulley 26 on the drive engine output shaft is connected, through a belt 26a, to a control pulley 45 fixed on a stub shaft 46 journaled in a bushing 47 which, as best illustrated in FIG. 4, is fixed between the top wall 16 of the housing 11 and a vertically-spaced raised deck housing portion 48, secured against said top wall. The raised deck housing portion 48 is formed with a top wall 49 and, as illustrated in FIGS. 2 and 4, a forwardly-extending portion 50 having divergent sidewall portions 51, 52 and a front wall skirt portion 53. The front wall skirt portion 53 has affixed thereto, at each side, a pair of opposed, vertically-extending bushings 54, 55 having journaled therein, respectively, vertically-upstanding portions 56, 57, of opposed, wheel axles 58, 59, to the outer ends of which are journaled the front wheels 14, 15, respectively. Fixed to the vertically-upstanding portions 56, 57 respectively, of the front wheel axles are opposed rearwardly-extending crank arms 60, 61, the outer ends of which are pivotally linked by a transverse tie rod 62. As is hereinbelow more particularly described, means is provided for moving the tie rod 62 to one side or the other of the central position at which it is normally positioned for straight forward or reverse travel of the apparatus, to turn the apparatus in one direction or the other.

As illustrated in FIGS. 3 and 4, the drive shaft 46 associated with the control pulley 45 extends upwardly of the upper deck portion 48 of the housing 11 and carries at its upper end a worm gear 63. The worm gear 63 is in mesh with a worm wheel 64 carried on a transversely-extending shaft 65 journaled in bearings in laterally-spaced, opposed brackets 66 and 67, affixed atop the raised deck housing portion 48. The shaft 65 at one end carries a bevel gear 68 in mesh with a second bevel gear 69 carried by a vertical shaft 70 journaled in a bearing member 71 secured between the top wall portion 16 and the raised deck housing portion 48 or the housing 11. The lower end of the shaft 70 extends through the top wall portion 16 and the raised deck housing portion 48 of the housing 11. The lower end of the shaft 70 extends through the top wall portion 16 of the housing 11 and has affixed thereto a small gear or pinion 72 in mesh with a steering gear 73 which, as illustrated in FIG. 2 is formed in its periphery with an arcuate cutout portion 74 effecting nonengagement with the pinion 72 when in position just opposite it, as illustrated in FIG. 2. The steering gear 73 is affixed on a stub shaft 73a journaled in a bearing 73b affixed with respect to the underside of the top wall portion 16 of the housing 11.

As illustrated in FIGS. 1 and 3, a pushrod 75 extends horizontally from the front of the machine along the underside of the housing 11, being guided for longitudinal motion with respect thereto by its passage through an opening in a front bracket member 76 and an eyelet 77 both fixed with respect to said housing. A helical spring 78 circumjacent the pushrod 75 and constrained between the front surface of the eyelet 77 and a stop washer 79 fixed on said pushrod, normally holds the pushrod in its forwardmost extended position. As illustrated in FIGS. 2 and 3, a flexible cable 80 is affixed at one end to the pushrod 75 at a position just rearward of the front bracket 76, as indicated at 81, and extends through an eyelet 82 fixed with respect to the housing 11 to be guided for connection at its other end to the outer end of a steering control rod 84, as indicated at 83. The steering control rod 84, as illustrated in FIG. 2, extends between a pair of spaced pins 85, 86, fixed with respect to the front wheel tie rod 62 and thence extends through an eyelet 87 fixed with respect to the housing 11 and constituting a pivot point for said steering control rod, as is hereinafter described. The inner end of the steering control rod 84 is pivotally connected to an outer portion of the steering gear 73, as indicated at 88 in FIG. 2. In the position of the steering gear 73 illustrated in FIG. 2, it will be noted that said gear is out of engagement with respect to the continuously-driven pinion gear 72 and that, therefore, the steering control rod 84 will remain stationary at such position with respect to the tie rod 62 as will maintain the positions of the front wheels 14 and 15 in the forward direction.

Means is provided for shifting the transmission mechanism 36 into reverse either automatically by means of preset self-contained mechanism hereinbelow described, or upon actuation of a pushrod 75 controlled by external sensing means. To this end, and considering first the structure and operating of the externally-actuated pushrod mechanism, said pushrod, as illustrated in FIG. 1 is provided with a spring-pressed, outwardly and upwardly-extending pawl 89 adapted, when said pushrod is actuated, to engage the peripheral teeth on a reversing gear 90. As illustrated in FIGS. 1 and 3, the reversing gear 90 is affixed to a shaft 91 journaled in a U-shaped bracket 92 fixed to and extending upwardly of the housing 11 at one side thereof. A gear shift shaft 93 is pivotally affixed at one end to an outer portion of the shifting gear 90, as indicated at 94. The outer end of the gear shift shaft 93 extends into a sleeve arm 95 to which it is connected through a lost motion device comprising a spring 96 circumjacent said shaft, and is constrained between the outer end of said arm and a washer 97 fixed to said shaft at a position forward of said arm. The shift arm 95 is provided with a laterally-extending portion 98 at its outer end which terminates in connection with the shift lever 100 of the transmission 36, as indicated at 99. The reversing gear 90 is in mesh with a smaller intermediate gear 101 carried by a shaft 102 between the upstanding arms of a U-shaped bracket 103 fixed with respect to the top wall 16 of the housing 11. The shaft 102 extends outwardly of the inside of the bracket 103, as is best illustrated in FIG. 3, and carries on its outer end a clutch control gear 104 having a peripheral recess 105. The clutch control gear 104 is adapted to engage with a continuously-driven drive gear or pinion 106 secured to the outer end of the above-described continuously-driven shaft 65. A rearwardly extending clutch drive shaft 107 is pivotally fixed at one end, as indicated at 108, to an outer side portion of the clutch control gear 104, as illustrated in FIGS. 1 and 3, and extends rearwardly to the clutch lever 110 associated with the transmission 36, whereat it is pivotally connected as indicated at 109.

Pushrod means is also provided for controlling the turning or reversal of direction of the apparatus upon abutment with a fixed object when travelling to the rear. To this end a pushrod 111 is provided for longitudinal sliding movement at the rear of the apparatus, said pushrod being guided through an opening in a rear bracket 112 affixed to and extending upwardly from the rear housing portion 44, and an eyelet 113 also extending upwardly from said housing forwardly of the bracket 112. The pushrod 111 has fixed thereon a washer 114 which abuts against the inside of the rear bracket 112 to limit outer movement thereof. A helical compression spring 115 circumjacent the pushrod 111 and constrained between the eyelet 113 and the washer 114 serves to hold said pushrod resiliently in its outermost position. As indicated at 116 in FIG. 1, a flexible cable 117 is connected to the inner end of the pushrod 111 and extends over a reversing pulley 118 journaled on a bracket 119 fixed with respect to and extending upwardly of the rear housing portion 44 of the housing 11 to terminate in connection with the inner end of said front pushrod as indicated at 120. With such construction, it will be apparent that upon pushing either of the front or rear pushrods 75 and 111 inwardly, the spring pawl 89 at the inner end of the front pushrod 75 will be brought into the engagement with the peripheral teeth of the reversal control gear 90 to actuate the steering mechanism as is hereinbelow described.

Means is provided for locking the front wheels 14, 15 in straight position when the apparatus is traveling either directly forward or directly backward. To this end a bracket 121 is centrally affixed to the tie rod 62, said bracket extending downwardly and having an opening receivable within which is a lock pin 122. The lock pin 122 is reciprocally mounted in a sleeve bearing 123 affixed to the transverse front skirt portion 19 of the housing 11. A helical compression spring 124 circumjacent the lock pin 122 and constrained between the outside of the sleeve bearing 123 and the inside of a washer 125 fixed to said lock pin near the outer end thereof, serves to hold said lock pin resiliently in its outermost position as permitted by cable means hereinbelow described. The inner end of the lock pin 122 is provided with an eyelet 126 which has connected thereto a first cable 127 extending over a reversing idler pulley 128 fixed to the underside from the housing 11 near the front end thereof, thence forwardly through an eyelet 129 fixed to the front end of the top wall 49 of said housing for connection with the front pushrod 75 at a position slightly to the rear of the connection thereto of cable 80, as indicated at 130 (see FIGS. 2 and 3). As illustrated in FIG. 2, a second cable 131 connected at one end to the eyelet 126 at the inner end of the lock pin 122 extends over an idler pulley 132 affixed against the underside of the housing 11 and terminates in connection with an inner end portion of the steering control rod 84, as indicated at 133.

Considering now the operation of the apparatus, and referring to FIGS. 1 through 4, it will be understood that since the lock pin 122 is received within the opening in the bracket 121 under normal conditions, the apparatus will travel in a straight ahead or straight to the rear course. It will move along a straight path (a straight forward path of travel, for example) until it reaches the end of its predetermined straight path of travel, whereupon the pushrod 75 will strike an abutment, whether in the form of a building, for example, or an abutment member particularly placed to effect reversal, whereupon, as hereinabove described, the spring pawl 89 will engage with and turn the reversing gear 90. Such anticlockwise turning of the reverse gear 90 (as illustrated in FIG. 1) will turn the clutch control gear 104 through the clutch intermediate gear 101, whereupon said clutch control gear will be moved clockwisely and into engagement with continuously driven gear 106 at the end of the peripheral cutout portion 105 thereof. The clutch gear 104 will then turn nearly a complete turn until it reaches the cutout portion 105 again, during which time the clutch drive shaft 107 will have been moved backwardly to temporarily disengage the clutch forming part of the transmission mechanism 36 through actuation of the clutch lever 110. At the same time, because of the 1 to 2 ratio of the clutch intermediate gear 101 with respect to the reversing gear 90, said reversing gear will have turned approximately 180 circular degrees to move its associated gear shift shaft 93 rearwardly, but an amount sufficient to correspondingly move the shift lever 100 of the transmission 36 into reverse.

It is also to be noted that when the pushrod is pushed inwardly to effect clutch actuation and reversal of the transmission mechanism 36 as described above, the cables 127 and 131 will be pulled over the idler pulleys 128 and 132, with the result that the lock pin 122 will be pulled outwardly of the tie rod bracket 121 to release same, and the steering control 84 will be pivoted counterclockwisely about the eyelet 87, as seen in FIG. 2 to simultaneously move the front wheels 14 and 15 to the right, as seen in FIG. 2, and to turn the steering gear 73 clockwisely, so that it engages with the continuously rotating pinion gear 72. Once having been brought into such engagement, the steering gear 73 will make a full 360° turn, and in doing so will first turn the wheels to the right and then to the left (as shown in FIG. 2) before coming into straight position again. At the same time that the engine transmission is put into reverse as described above, the front wheels 14 and 15 will first be turned so that the vehicle moves in one direction and then immediately turn in the other direction before resuming straight position again. The device will thereafter continue to move backwards until the rearwardly-extending pushrod 111 strikes an abutment, whereupon a new cycle of transmission reversal and offset steering as described above will be effected. The device will continue to move back and forth in this manner until reaching the finish point. To automatically stop the engine at the finish point, the hand throttle 137 (connected with the engine as by cable 138) can be made to strike an abutment stake (not illustrated) appropriately placed near the finish point for this purpose. As illustrated in FIG. 5, the throttle 137 will be moved to the stop position, which will be its terminal position to the right (see FIGS. 1 and 5). It will be understood that the above-described reversal and steering will be so timed, and of such amounts with respect to the steering, as will offset successive paths of travel of the apparatus by the distance needed to mow or otherwise process an abutting strip of ground.

The self-contained mechanism by means of which the line of travel of the apparatus will automatically be reversed after completion of each straight line path of travel run, whereby the operation of the mower can be made to be entirely independent of the external abutment actuating means as described above, will now be described. With reference to FIGS. 1 through 5, said mechanism comprises an elongated lead screw 140 journaled between upstanding front and rear brackets 141, 142, respectively, mounted on the top wall portion 16 of the housing 11 and in inside spaced, parallel relation with respect to, and approximately longitudinally between, the front and rear pushrods 75 and 111, respectively. The rear end of the lead screw 140 extends through the rear bracket 142 and carries at its outer end a first bevel gear 143 in mesh with a second gear 144 carried by a short shaft 145 journaled in an upstanding bracket 146, which bracket is also affixed to the top wall portion 16 of the housing 11. The outer end of the short shaft 145 carries a chain gear 147 in mesh with the drive chain 40.

The lead screw 140 carries a right-angular tripper member 148 threadingly received thereon and fitted, at a forwardly-extending upper end portion thereof, with a hinged abutment member 149. The lower end of the downwardly-extending threaded arm of the tripper member 148 is provided with a through opening relatively slidingly received within which is a reversal rod 150 carried in spaced parallel relation below the lead screw 140, said reversal rod being slidingly received within through openings in the front and rear brackets 141, 142, respectively. A U-shaped retainer member 151 extends slidingly through a lateral opening in the upstanding arm portion of the rear bracket 142 and vertically upwardly through longitudinally-spaced, diametrical openings in the reversal rod 150 at each side of said upstanding arm portion. A helical compression spring 152 circumjacent the reversal rod 150 and constrained between the inside of the rear bracket 142 and the U-shaped retainer member 151 serves to resiliently constrain said reversal rod to its forwardmost position, as is best illustrated in FIG. 5.

Adjustably mounted on the reversal rod 150 is an abutment member 153 securable in adjusted position therealong by a thumb screw 154. The forward end of the reversal rod 150 carries a hinged abutment tripper member 155, which is normally held in open position, as illustrated in FIG. 5, by a self-contained torsion spring (not illustrated).

The automatic self-contained reversal mechanism further comprises a second lead screw 156 transversely disposed above the top wall 49 of the raised deck housing portion 48 of the housing 11, and somewhat in front of the forward end of the lead screw 140. One end of the second lead screw 156 is journaled in an upstanding bracket 157. The other end thereof is journaled in a housing structure 157a. The second lead screw 156 carries a gear 158 having an arcuate cutout 159, for the purpose hereinafter appearing. The second lead screw 156 also carries, at its extreme outer end, a pinion 160 having a flat 161, said flat normally being disposed in spaced, aligned position above a linear rack 162 provided along an inner end portion of the front pushrod 75. Also fitted to the second lead screw 156, at a position between the gear 158 and the pinion 160, is a diametrically-extending, outwardly-projecting crosspin 163.

As is hereinbelow more particularly described, the second lead screw gear 158 is intermittently driven by an intermediate drive gear 164 which is journaled with respect to the supporting bracket 67. The intermediate gear 164 is in mesh with the continuously-driven drive gear or pinion 106, described above. A guide shaft 165 is fixed in spaced parallel relation above the second lead screw 156, being secured between the housing structure 157a and the bracket 157, and extends through the looped upper end portion of an antirotation retainer 167 fitted to and extending outwardly of a travelling abutment member 166 threadingly received on said second lead screw.

Swingably secured to the guide shaft 165, as by a pivot pin 169, is an upstanding, elongated trip lever 168, said trip lever having at its lower end an elongated slot through which said guide shaft and an inner end portion of the second lead screw 156 extend. The upper end of the trip lever 168 is provided with an outwardly-extending dog 170 selectively engageable with any one of a plurality of teeth 171 fixed along a control rod 172 extending from front to back within the housing structure 157a. The forward end of the control rod 172 has circumjacently fitted thereon a compression spring 173 constrained between an interior wall portion of said housing structure and the outer end of said control rod for resiliently urging said control rod to its forwardmost limit position. As hereinabove described and as illustrated in FIGS. 1 and 5, the hand throttle 137, in the position illustrated, is in off position, and will be open to the desired degree of speed by pushing forwardly to engage any one of the teeth 171 with the dog 170, said dog being resiliently constrained in the direction of said teeth by means of a push lever 174 provided at its outer end with a circumjacent compression spring 175 constrained between a handle at the outer end of said push lever and the outside wall of the housing structure 157a. It will be noted that the throttle lever 137 pivots about a pivot pin 137a, whereby said lever will be constrained to its counterclockwisemost off position by action of the compression spring 173. When the throttle lever 137 is pushed forwardly upon starting the engine, any one of the teeth 171 will engage with the dog 170 of the trip lever 168 to hold the throttle in adjusted position against the reactive force of the compression spring 173. It will further be noted that once the throttle is so locked in a selected "on" position, it can be manually returned to "off" position again by pushing in upon the push lever 174 to disengage the dog 170.

Considering now the operation of the device, it will be understood that the drive chain 40 will be moving in one direction or the other, as described above, depending upon whether the mower is moving in a forward or reverse direction. When moving in the forward direction, the lead screw 140 is so threaded as to move the tripper member 148 forwardly until such time as the abutment member 149 strikes the upwardly-projecting end of the crosspin 163 of the second lead screw 156. At such time, the associated gear 158 will be turned sufficiently in the anticlockwise direction (as illustrated in FIG. 5) to move its teeth in mesh with the continuously-driven intermediate drive gear 164, whereupon the gear 158 and its associated second lead screw 156 will be turned one full turn in the anticlockwise direction until the arcuate cutout portion 159 moves into position opposite the teeth of the intermediate drive gear 164. The second lead screw 156, in making its complete revolution as described above, will, at the same time, cause the pinion 160 to engage with the rack 162 of the pushrod 75 and move it backwardly, to effect reversal as described above. Once reversal of the path of travel of the mower has thus been automatically established, the drive chain 40 will be moving in the opposite direction to reverse the turn direction of the lead screw 140. This, in turn, will cause the tripper member 148 to travel backwardly until such time as the lower end thereof abuts the abutment member 153, whereupon the reversal rod 150 will begin to move rearwardly along with said tripper member until the abutment tripper member 155 at the forward end of said reversal rod comes into contact with the downwardly-projecting outer end portion of the crosspin 163, whereupon the second lead screw 156 and its associated gear and pinion 158, 160, respectively, will again be moved one full turn in the anticlockwise direction, as described above, whereby reversal of travel to a forward direction will be affected as hereinabove described. In this connection, it will be noted that the length of path of travel in either direction will be the same, and can be controlled over a wide range by adjusting the position of attachment of the abutment member 153 along the reversal rod 150.

It will be noted that each time a reversal of path of travel of the mower is automatically accomplished by the above-described mechanism, the travelling abutment member 166 will have been incrementally moved in the direction of the trip lever 168, the second lead screw 156 being so threaded for this purpose. Eventually, the travelling abutment member 166 will have reached the trip lever 168 causing it to be pivotally turned in such direction as to disengage the dog 170 from the selected one of the teeth 171 of the control rod 172, whereupon, under the compressional force of the compression spring 173, the throttle 137, as described above, will be turned to "off" position to stop the machine. It will be noted that not only can the length of travel of the mowing path in a back-and-forth direction be controlled as described above, but also the number of back-and-forth passes and, hence, the breadth of the rectangular area to be mowed can be controlled by a positional adjustment of the travelling abutment member 166 along its second lead screw 156 before setting the apparatus into operation. To this end, the antirotation retainer 167 is loosely received in an opening in the travelling abutment member 166 whereby it can readily be removed to permit manual positioning therealong said second lead screw in accordance with the breadth of the area to be mowed before automatic release of the throttle and consequent turnoff of the motor.

I claim:

1. An automatically-controlled, self-powered land travelling apparatus for lawn mowing and the like, comprising a housing, rear wheel means supporting the rear of said housing for rolling motion along the ground, a pair of front wheels supported at the front of said housing for rolling motion of the front of said housing along the ground, tie rod means including a tie rod movable from side-to-side with respect to the front of said housing for steering said front wheels from one side to the other, a rotary engine secured with respect to said housing, drive means interconnecting said engine with said rear wheels for moving said apparatus along the ground, said apparatus moving drive means including a clutch having directional reverse mechanism, a pushrod reciprocably mounted with respect to said housing and movable between limit positions, resilient means normally constraining said pushrod in one of its limit positions, and automatic means including said tie rod means and said pushrod, and driven by said engine, for actuating said clutch and reversing said transmission and simultaneously turning said front wheel first in one direction and then in the other direction for sufficient lengths of time, respectively, for offsetting the reversed path of travel of said apparatus by a predetermined distance, an actuating means comprising a lead screw driven by said rear wheels drive means, a tripper member threadingly received on said lead screw and operative to be moved back and forth therealong between limit positions, and mechanism controlled by said tripper member reaching one or the other of its limit positions for moving said pushrod to the other of its limit positions, means controlled by the number of back and forth movements of said tripper member along said lead screw for automatically stopping said rotary engine, said engine stopping means comprising a second lead screw, a travelling abutment member threadingly received on said second lead screw, mechanism for incrementally and periodically turning said second lead screw in one direction every time said tripper member reaches one or the other of its limit positions, a trip lever movably supported in proximity to said second lead screw near one end thereof and operative to be contacted and moved by said travelling abutment member when in a limit position thereof along said second lead screw, and mechanism controlled by the movement of said trip lever for controlling the throttle of said engine.

2. An automatically-controlled, self-powered land travelling apparatus as defined in claim 1 including means for adjustably preselecting the distance between said limit positions of said tripper member for controlling the length of the rectangular area of land to be covered by said apparatus.

3. An automatically-controlled, self-powered land travelling apparatus as defined in claim 1 including means for adjusting the starting position of said travelling abutment member on said second lead screw for controlling the breadth of the rectangular area of land to be covered by said apparatus.

4. An automatically-controlled, self-powered land travelling apparatus as defined in claim 3, wherein said throttle controlling mechanism comprises a control rod pivotally connected with the engine throttle, resilient means normally constraining said control rod in the "off" position of said throttle, a dog on said trip lever, and a plurality of teeth spaced along said trip lever and adapted to be engaged, selectively, by said dog for releasably holding said control rod in its "on" position.

5. An automatically-controlled, self-powered land travelling apparatus as defined in claim 4, including manually-controlled means for releasing said trip lever dog with respect to said control rod teeth.

6. An automatically-controlled, self-powered land travelling apparatus as defined in claim 3, including means for adjustably preselecting the distance between said limit positions of said tripper member for controlling the length of the rectangular area of land to be covered by said apparatus.

7. An automatically-controlled, self-powered land travelling apparatus as defined in claim 6, wherein said wheel turning means comprises a steering gear rotatably journaled with respect to said housing, a continuously rotating pinion engageable with said steering gear, a recess within the periphery of said steering gear, said pinion gear being so disposed as to be received within said steering gear recess for normal disengagement with said steering gear, means at the inner end of said pushrod for moving said steering gear into mesh with said pinion for turning said steering gear through a cycle of operation, a steering control rod pivotally linked at one end to the face of said steering gear, a pivotal opening fixed with respect to said housing through which said steering control rod extends, and a pair of spaced pins on said tie rod between which said steering control rod extends at its other end for moving said tie rod in response to turning of said steering gear.

8. An automatically-controlled, self-powered land travelling apparatus as defined in claim 7, wherein said steering gear moving means comprises a spring pawl at the inner end of said pushrod operative to engage with and move the peripheral teeth of said steering gear upon front to back movement of said pushrod.